United States Patent
Ludwig et al.

(10) Patent No.: US 10,302,753 B2
(45) Date of Patent: May 28, 2019

(54) ULTRASONIC SENSOR

(71) Applicant: VALEO Schalter und Sensoren GmbH, Bietigheim-Bissingen (DE)

(72) Inventors: Michael Ludwig, Mannheim (DE); Wolfgang Katzenberger, Wemding (DE); Stefan Triebl, Bietigheim-Bissingen (DE); Hans-Wilhelm Wehling, Bietigheim-Bissingen (DE); Karl-Heinz John, Wemding (DE); Oliver Eidel, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 441 days.

(21) Appl. No.: 15/107,248

(22) PCT Filed: Dec. 4, 2014

(86) PCT No.: PCT/EP2014/076579
§ 371 (c)(1),
(2) Date: Jun. 22, 2016

(87) PCT Pub. No.: WO2015/096962
PCT Pub. Date: Jul. 2, 2015

(65) Prior Publication Data
US 2016/0349360 A1    Dec. 1, 2016

(30) Foreign Application Priority Data
Dec. 23, 2013   (DE) ................... 10 2013 022 049

(51) Int. Cl.
*G01S 7/00*    (2006.01)
*G01S 7/521*   (2006.01)
(Continued)

(52) U.S. Cl.
CPC .............. *G01S 7/521* (2013.01); *G10K 9/122* (2013.01); *G10K 9/22* (2013.01); *G10K 11/004* (2013.01)

(58) Field of Classification Search
USPC ......................................................... 367/188
See application file for complete search history.

(56) References Cited

U.S. PATENT DOCUMENTS 5,463,384 A * 10/1995 Juds ...................... B60Q 9/008
                                                     340/435
5,844,471 A * 12/1998 Daniel ................... B60Q 9/007
                                                     340/435
(Continued)

FOREIGN PATENT DOCUMENTS

DE       198 32 072 A1     2/1999
DE       19832072 A1 *     2/1999 ............... G10K 9/22
(Continued)

OTHER PUBLICATIONS

International Search Report issued in PCT/EP2014/076579 dated Feb. 27, 2015 (3 pages).
(Continued)

*Primary Examiner* — James R Hulka
(74) *Attorney, Agent, or Firm* — Osha Liang LLP

(57) ABSTRACT

An ultrasonic sensor (1) comprises a housing (2) and a diaphragm (4), to which a piezo-electric element (6) is fastened, and an electric connector region (8) which has an earth connector (24). A layer made from an electrically non-conducting material is arranged between the diaphragm (4) and the piezo-electric element (6), and the diaphragm (4) is connected to the earth connector (24) in an electrically conducting manner.

5 Claims, 2 Drawing Sheets

Figure 1:
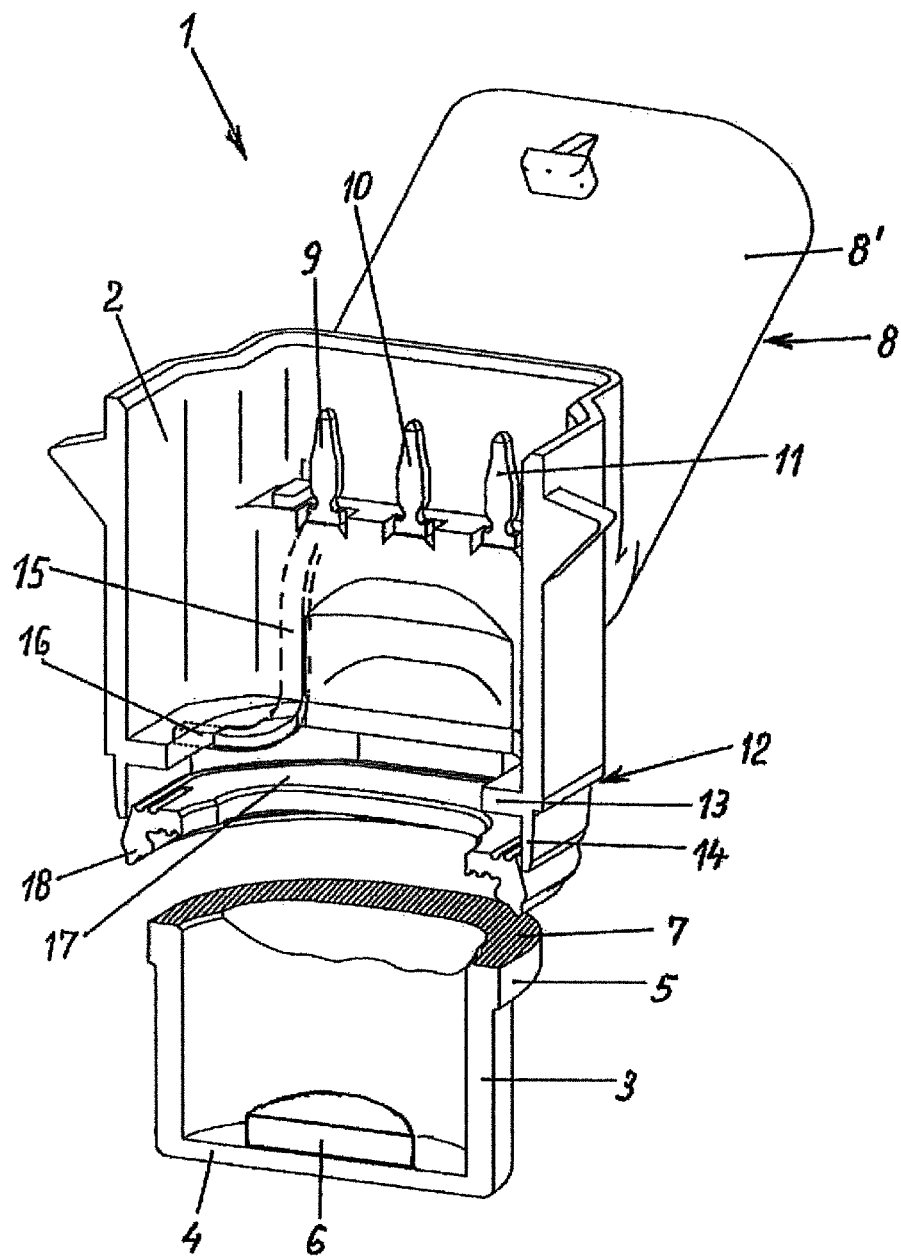

(51) Int. Cl.
*G10K 9/122* (2006.01)
*G10K 9/22* (2006.01)
*G10K 11/00* (2006.01)

(56) References Cited

U.S. PATENT DOCUMENTS

| | | | |
|---|---|---|---|
| 6,159,149 A | * | 12/2000 | Erikson ............... A61B 8/4483 |
| | | | 600/437 |
| 2002/0130770 A1 | * | 9/2002 | Keyworth ............... G01S 7/521 |
| | | | 340/436 |
| 2004/0090195 A1 | * | 5/2004 | Motsenbocker ........ B63B 43/18 |
| | | | 318/109 |

FOREIGN PATENT DOCUMENTS

| | | | |
|---|---|---|---|
| DE | 10 2005 056 607 A1 | 8/2006 | |
| DE | 10 2005 009620 A1 | 8/2006 | |
| DE | 102005009620 A1 * | 8/2006 | ............ G01S 7/521 |
| DE | 10 2007 043479 A1 | 3/2009 | |
| DE | 102007043479 A1 * | 3/2009 | ............ C23C 22/78 |
| DE | 10 2009 040374 A1 | 3/2011 | |
| DE | 10 2010 010 099 A1 | 6/2011 | |
| DE | 10 2011 120 391 A1 | 6/2013 | |
| EP | 0 025 215 A2 | 3/1981 | |
| EP | 2 246 401 A1 | 11/2010 | |
| EP | 2 631 903 A2 | 8/2013 | |
| JP | 2001-238 292 A | 8/2001 | |
| JP | 2002204498 A | 7/2002 | |
| JP | 3 183082 U | 4/2013 | |

OTHER PUBLICATIONS

Written Opinion of the International Searching Authority issued in PCT/EP2014/076579 dated Feb. 27, 2015 (5 pages).
German Search Report issued in DE 10 2013 022 049.1 dated Mar. 13, 2014 (5 pages).
European Office Action in corresponding German Application No. 1408080971.7-1003, dated Feb. 13, 2018 (5 pages).

* cited by examiner

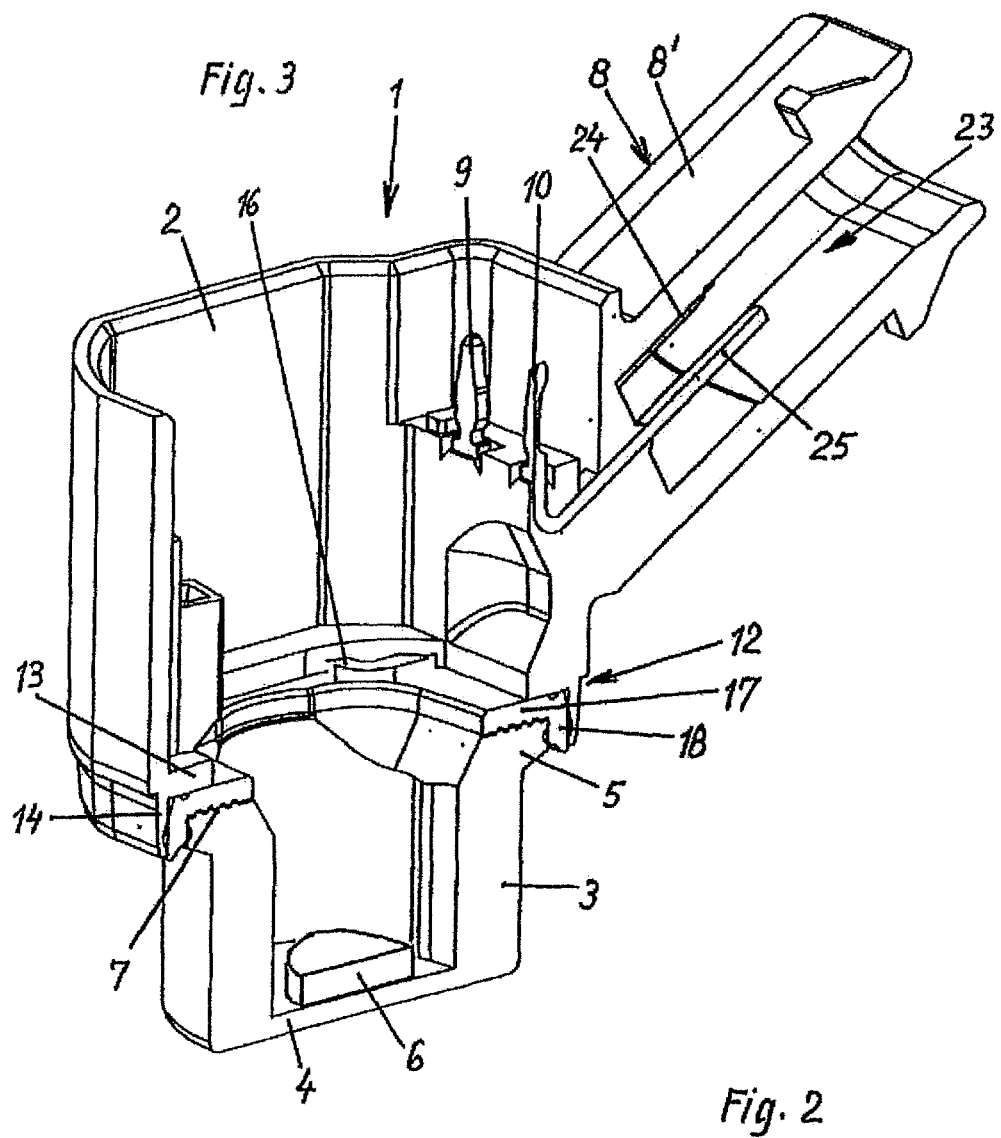

ULTRASONIC SENSOR

The invention relates to an ultrasonic sensor of the generic type which is specified in the precharacterizing clause of Claim 1.

Ultrasonic sensors of this type are used in motor vehicles as components of parking aid systems. The ultrasonic sensors serve to measure the distance of obstacles, the ultrasonic sensors emitting ultrasonic signals and receiving signals which are reflected on obstacles in the vicinity of the motor vehicle. The distance of the ultrasonic sensor from an obstacle can be determined from the transit time of the signal.

DE 10 2005 056 607 A1 has disclosed an ultrasonic sensor which has a housing with a bottom section which acts as a diaphragm. A piezo-electric vibrator is fastened to an inner face of the bottom section, which inner face is directed into the interior of the housing. The piezo-electric vibrator has a first electrode on a fastening face of the vibrator, which first electrode is fastened to the bottom section, and a second electrode on an opposite face of the vibrator. An electrically conducting component is provided between the first electrode and the bottom section. Here, the vibrator is connected on one side to an alternating voltage, and the other side is connected to earth.

It is known, moreover, to fasten the piezo-electric element to the diaphragm by means of an electrically conducting adhesive, which corresponds with regard to the function to the electrically conducting component between the vibrator and the bottom section.

The present invention is based on the object of providing an ultrasonic sensor of the generic type mentioned at the outset, which ultrasonic sensor is improved with regard to its manufacturing costs and/or quality.

This object is achieved by way of an ultrasonic sensor having the features of claim 1.

The ultrasonic sensor according to the invention can be manufactured more simply and with higher quality on account of the clear potential separation between the piezo-electric element and the diaphragm. The earth attachment of the diaphragm avoids interference signals which might influence the reception of reflected ultrasonic signals.

It is provided according to one preferred refinement of the invention that the non-conducting layer is a paint which is applied to an electrode of the piezo-electric element. The paint is preferably temperature-resistant and withstands high mechanical loading. The application of the insulating layer using a paint is possible inexpensively in a simple way. The piezo-electric element is preferably fastened with its paint layer to the diaphragm by means of an adhesive.

According to one embodiment of the invention, the diaphragm is an integral part of a diaphragm body which is fastened to the housing and which preferably has a radial flange on its side which faces away from the diaphragm. For improved contact for the connection to an earth connector, it is expedient that the flange has an end side with an electrically conducting surface and/or with a coating made from an electrically conducting material. The electrically conductive material can be applied, for example, in a liquid chemical process or the electrically conducting surface can be formed in this way.

In order to attach the diaphragm body to the housing, it is advantageous that a radial flange and a stub which is directed towards the diaphragm body which serve to receive the flange on the diaphragm body are formed on the housing. A further refinement consists in that a decoupling element (also called a stopper, in particular) made from electrically conductive material and/or with electrically conducting end faces which are connected to one another, in particular, in an electrically conducting manner is arranged between the flange of the diaphragm body and the flange of the housing. This has the advantage that a direct metallic connection of a contact element to the coating on the end side of the flange on the diaphragm is avoided, in order to prevent the signal impairments such as hissing as a result of vibrations of metal on metal and associated therewith. Furthermore, it is expedient that a contact element which is connected to the earth connector bears against an end side of the decoupling element. The electric connector region preferably comprises a plug which is configured in a stub on the housing.

One exemplary embodiment of the invention is explained in greater detail in the following text using the drawing, in which:

FIG. 1 shows a longitudinal section through components of an ultrasonic sensor in the state, in which they are not yet assembled, FIG. 2 shows an enlarged illustration of a section through a diaphragm with the piezo-electric element which is fastened thereto, and FIG. 3 shows a longitudinal section through the components according to FIG. 1 in the assembled state in a modified perspective.

The longitudinal section in FIG. 1 is a perspective illustration of an ultrasonic sensor 1 with a diaphragm body 3 which is fastened to a housing 2. The diaphragm body 3 has a diaphragm 4 at its lower end in relation to the position which is shown in FIG. 1. That is to say, the bottom of the diaphragm body forms the diaphragm and/or is also called a diaphragm bottom. At the upper end, the diaphragm body 3 has a radially outwardly directed flange 5. A piezo-electric element 6 is fastened to the inner side of the diaphragm 4. The radial flange 5 has an end side 7 with a coating made from an electrically conducting material.

A laterally projecting stub 8' is arranged on the housing 2, which stub 8' serves to receive a plug and in this way forms an electric connector 8. Electric conductors are guided from the said stub 8' into the housing 2 to plug-in contacts 9, 10, 11. The plug-in contacts 10, 11 are for positive potential and negative potential, and the plug-in contact 9 is an earth connector. A printed circuit board (not shown in the drawing) which is to be inserted in the upper region of the housing 2 is connected to the said plug-in contacts 9, 10 and 11. A radially inwardly directed flange 13, on which a stub 14 which is directed towards the diaphragm body 3 is integrally formed, is situated at an end 12 of the housing 2 which faces the diaphragm body 3. Starting from the plug-in contact 9, an electric conductor 15 which preferably consists of a flat wire is guided downwards to the end 12 of the housing 2 and is shaped on the end side as a contact element 16 in such a way that the contact element extends under the flange 13 in a flat manner.

An annular decoupling element 17 (called a stopper 17 in the following text) is provided between the flange 12 of the housing 2 and the flange 5 of the diaphragm body 3, the outer circumference of which decoupling element 17 is dimensioned in such a way that it can be received within the stub 14 on the flange 13. On its side which faces the diaphragm body 3, the stopper 17 has an axial bead 18. The stopper 17 is configured in such a way that it is made from electrically conductive material and/or its end sides are electrically conducting. In particular, the end sides are connected to one another in an electrically conducting manner. The end sides of the stopper 17 are attached electrically; in particular, the one end side is connected electrically to the end side 7 of the flange 5, and the other, opposite end side is connected electrically to the contact element 16.

FIG. 2 shows an enlarged illustration of a section through the diaphragm 4 and the piezo-electric element 6 which is fastened thereto. The piezo-electric element 6 comprises two electrodes 19, 20 which are connected to the printed circuit board in the housing 2 by means of connector lines (not shown in the drawing). On the side which faces the diaphragm 4 (in the exemplary embodiment which is shown, this is the side with the electrode 20), the piezo-electric element 6 is provided with a layer 21 made from an electrically non-conducting material. An adhesive 22 which is applied on the inner side of the diaphragm 4 serves to fasten the piezo-electric element 6 to the electrically insulating layer 21. The layer 21 can be, for example, a paint layer.

FIG. 3 shows a longitudinal section through the ultrasonic sensor 1 according to FIG. 1, but in the assembled state of the components and in a different perspective. As a result, the stub 8' on the housing 2 is also shown in section, from which it can be seen that the stub 8' is configured as a plug 23 and the contacts 24, 25 which are provided therein are connected to the plug-in contacts 9, 10. The annular stopper 17 is situated within the stub 14 and is in satisfactory flat contact with the flange 13 of the housing 2. The contact element 16 is situated between the flange 13 and the stopper 17, which contact element 16 therefore produces an electrically conducting connection between the stopper 17 and the plug-in contact 9 or contact 24 in the plug 23, the contact 24 forming an earth connector. The diaphragm body 3 bears with the electrically conducting end side 7 of the flange 5 against the lower end side of the stopper 17, the bead 18 surrounding the outer edge of the flange 5 and bearing against the latter. Since the stopper 17 is made from electrically conducting material or at least has electrically conducting end faces which are also connected to one another in an electrically conducting manner, there is an earth attachment of the diaphragm 4 or the diaphragm body 3 via the stopper 17, the contact element 16, and the electric conductor 15 (FIG. 1) to the contact 24. A ring (not shown in the drawing) is preferably provided for reliable fastening of the diaphragm body 3 to the housing 2 and satisfactory contact of the respective bearing faces and the contact element 16, which ring engages behind the flange 5 of the diaphragm body 3 and is fastened to the circumferential face of the stub 14. The described embodiment ensures that the diaphragm 4, the stopper 17 and the housing 2 do not have any potential.

The invention claimed is:

1. An ultrasonic sensor comprising:
   a housing;
   a diaphragm, to which a piezo-electric element is fastened;
   an electric connector region which comprises an earth connector,
   wherein a layer made from an electrically non-conducting material is arranged between the diaphragm and the piezo-electric element, and the diaphragm is connected to the earth connector in an electrically conducting manner,
   wherein the diaphragm is an integral part of a diaphragm body fastened to the housing,
   wherein the diaphragm body has a first radial flange on a side facing away from the diaphragm,
   wherein a second radial flange and a stub directed toward the diaphragm body are formed on the housing and serve to receive the first radial flange on the diaphragm body;
   wherein a decoupling element made from electrically conductive material with electrically conducting end faces is arranged between the first radial flange of the diaphragm body and the second radial flange of the housing, and
   wherein a contact element which is connected to the earth connector bears against an end side of the decoupling element.

2. The ultrasonic sensor according to claim 1, wherein the non-conducting layer is a paint which is applied to an electrode of the piezo-electric element.

3. The ultrasonic sensor according to claim 2, wherein the piezo-electric element is fastened with its paint layer to the diaphragm by an adhesive.

4. The ultrasonic sensor according to claim 1, wherein the flange has an end side which is provided with an electrically conducting surface and/or with a coating made from an electrically conducting material.

5. The ultrasonic sensor according to claim 1, wherein the electric connector region comprises a plug which is configured in a stub on the housing.

* * * * *